US009529935B2

(12) United States Patent
Davies (10) Patent No.: US 9,529,935 B2
(45) Date of Patent: Dec. 27, 2016

(54) EFFICIENT LINK MANAGEMENT FOR GRAPH CLUSTERING

(71) Applicant: Palo Alto Research Center Incorporated, Palo Alto, CA (US)

(72) Inventor: Daniel Davies, Palo Alto, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 379 days.

(21) Appl. No.: 14/191,224

(22) Filed: Feb. 26, 2014

(65) Prior Publication Data

US 2015/0242532 A1   Aug. 27, 2015

(51) Int. Cl.
*G06F 17/30* (2006.01)
*G06F 17/10* (2006.01)

(52) U.S. Cl.
CPC ......... *G06F 17/30958* (2013.01); *G06F 17/10* (2013.01); *G06F 17/30* (2013.01)

(58) Field of Classification Search
None
See application file for complete search history.

(56) References Cited

U.S. PATENT DOCUMENTS

| 2005/0071595 | A1* | 3/2005 | Irish | G06F 12/023 711/170 |
| 2011/0173264 | A1* | 7/2011 | Kelly | G06Q 10/10 709/205 |
| 2013/0325408 | A1* | 12/2013 | Song | G01N 24/081 702/189 |

* cited by examiner

Primary Examiner — Amresh Singh
(74) Attorney, Agent, or Firm — Shun Yao; Park, Vaughan, Fleming & Dowler LLP (57) ABSTRACT

One embodiment of the present invention provides a computing system. The computing system includes a processor and a memory. The memory stores instructions which when executed by the processor cause the processor to perform a method. The method comprises identifying a first vertex and a second vertex in a graph as candidates for a link between the first and the second vertices. The first and second vertices represent elements in a data set. The method further comprises determining a link indicator based on a first link count, which indicates a sum of respective weights of links of a vertex, associated with the first vertex and a second link count associated with the second vertex. The method also includes determining whether to connect the first and second vertices with a link based on the link indicator's conformity with a link threshold, which determines whether to connect two vertices using a link.

24 Claims, 8 Drawing Sheets

EFFICIENT LINK MANAGEMENT FOR GRAPH CLUSTERING

BACKGROUND

Field

The present disclosure relates to data management. More specifically, the present disclosure relates to a method and system for efficient data management for detecting information of interest.

Related Art

The exponential growth of computing power has made it possible to extract information of interest, such as shopping preferences, social media activities, medical referrals, and e-mail traffic patterns, using efficient data analysis. Such data analysis requirements have brought with them an increasing demand for efficient computation. As a result, equipment vendors race to build larger and faster computing devices with versatile capabilities, such as graph clustering, to calculate information of interest efficiently. However, the computing capability of a computing device cannot grow infinitely. It is limited by physical space, power consumption, and design complexity, to name a few factors. Furthermore, computing devices with higher capability are usually more complex and expensive. More importantly, because an overly large and complex computing device often does not provide economy of scale, simply increasing the capability of a computing device may prove economically unviable.

One way to meet this challenge is to increase the efficiency of data analysis tools used for extracting information of interest from a large and arbitrary data set. Increasing efficiency of data analysis of such a large data set can increase the complexity of the analysis tools, typically not suitable for large-scale real-life deployment. Hence, efficient data analysis techniques additionally require viability of real-life deployment.

Graph clustering is a tool for analyzing large data sets. Typically, the elements in the data set are represented as vertices and the relationships among the elements are represented as links (can also be referred to as edges or connections) in a graph. Graph clustering finds clusters (i.e., groups) of similar elements such that the vertices in one cluster are more densely interconnected with each other than they are to vertices in other clusters. In this way, the data set can be viewed at a more abstract level and allows a computing device to determine the information of interest.

While graph clustering brings many desirable features to data analysis, some issues remain unsolved in efficiently and accurately managing resources for graph clustering for obtaining information of interest from large and arbitrary data sets.

SUMMARY

One embodiment of the present invention provides a computing system. The computing system includes a processor and a memory. The memory stores instructions which when executed by the processor cause the processor to perform a method. The method comprises identifying a first vertex and a second vertex in a graph as candidates for a link between the first and the second vertices. The first vertex and the second vertex represent elements in a data set and the link represents a type and strength of relationship between the first and the second vertices. The method further comprises determining a link indicator based on a first link count associated with the first vertex and a second link count associated with the second vertex. This link count indicates a sum of respective weights of links of a vertex. The method also includes determining whether to connect the first and the second vertices with a link based on the link indicator's conformity with a link threshold. This link threshold represents a measurement to determine whether to connect two vertices using a link.

In a variation on this embodiment, the link indicator is one or more of: (i) a function of the first and the second link counts, wherein function returns a value numerically comparable to the link threshold; and (ii) a function of link counts of a group of vertices of the graph, wherein the function returns one or more values numerically comparable to the link threshold.

In a variation on this embodiment, the method also comprises connecting the first and the second vertices with a link in response to at least one of the first and the second link counts being zero.

In a variation on this embodiment, the method also comprises increasing the first and the second link counts in response to connecting the first and the second vertices with a link.

In a variation on this embodiment, the method also comprises determining the link threshold based on the size of the allocated memory.

In a further variation, determining the link threshold comprises determining the vertex memory size by subtracting the size of the memory overhead from the size of the allocated memory, determining the average memory segment per vertex by dividing the vertex memory size by the number of vertices in the graph, and squaring the average memory segment per vertex.

In a variation on this embodiment, the method also comprises limiting memory size allocated for graph clustering on the graph to a high or a low threshold.

In a further variation, the method also comprises applying a suitable graph clustering technique to the graph with a modified memory size. This modified memory size represents an increased memory size than the low threshold or a decreased memory size than the high threshold.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of efficiently collecting information of interest from large and/or arbitrary data sets is solved by connecting vertices for graph clustering in a resource-efficient and manageable way. Large data sets do not often present meaningful information. For example, shopping history at a retail store can present an arbitrary set of data without directly indicating information of interest, such as customer shopping preferences or customers with similar shopping preferences. One way of obtaining information of interest is by representing the elements in the data sets and their interrelationships as vertices and links, respectively, in a graph and clustering the vertices accordingly. One way of clustering the vertices (and/or corresponding links) can be by propagating a "label" of a vertex to another, thereby forming a cluster (e.g., a group) of vertices with the same label. In this disclosure, the term "vertex identifier" refers to any value which can be used to identify a vertex in a graph. The terms "label" and "identifier" have been used interchangeably.

With existing tools, graph clustering often is not efficient and may become too large to obtain information of interest within available computational resources and/or desired temporal requirements, and thereby may fail to obtain the information of interest in a viable way. For example, such a tool may not be able to create and store all the links while representing the elements in the data sets before deciding which links to keep, because there may not be enough memory to store the links. Even when the tool avoids retaining information regarding all links in memory by using multiple passes to examine and instantiate links, the resulting computation becomes slow. Furthermore, simply decimating the links in a fixed pattern or omitting links at random is likely to leave vertices isolated. As a result, these isolated vertices cannot be clustered.

To solve this problem, two vertices can be connected to form a link (which can also be referred to an edge or a connection) based on a condition, thereby discarding redundant, or less important (e.g., introduces little new information) links. In this way, links that are attached to lightly connected vertices can be preserved by adjusting the links between heavily connected vertices. In some embodiments, a system for obtaining information of interest from a data set associates a link count with a respective vertex which represents the sum of the weight of links for that vertex. If the weight of a respective link is one, the link count of a vertex represents the number of links of the vertex. This link count of a vertex is incremented by the weight of a new link when that new link is established with that vertex (e.g., a link is added to the vertex). If the weight of the link is one, the link count is incremented by one.

To establish a link between two vertices, the system calculates a link indicator based on the link counts of the two vertices. In some embodiments, this link indicator is a product of the link counts. The system refrains from connecting the two vertices based on whether the link indicator conforms to a link threshold. This link threshold indicates whether two vertices should be connected with a link. For example, the system can refrain from connecting the two vertices if the product of the corresponding link count is greater than the link threshold. In this way, the system reduces the size of the graph representing the data set and, hence, can perform graph clustering to obtain information of interest from the graph in a memory- and computation-efficient way.

System Architecture

Figure 1A:
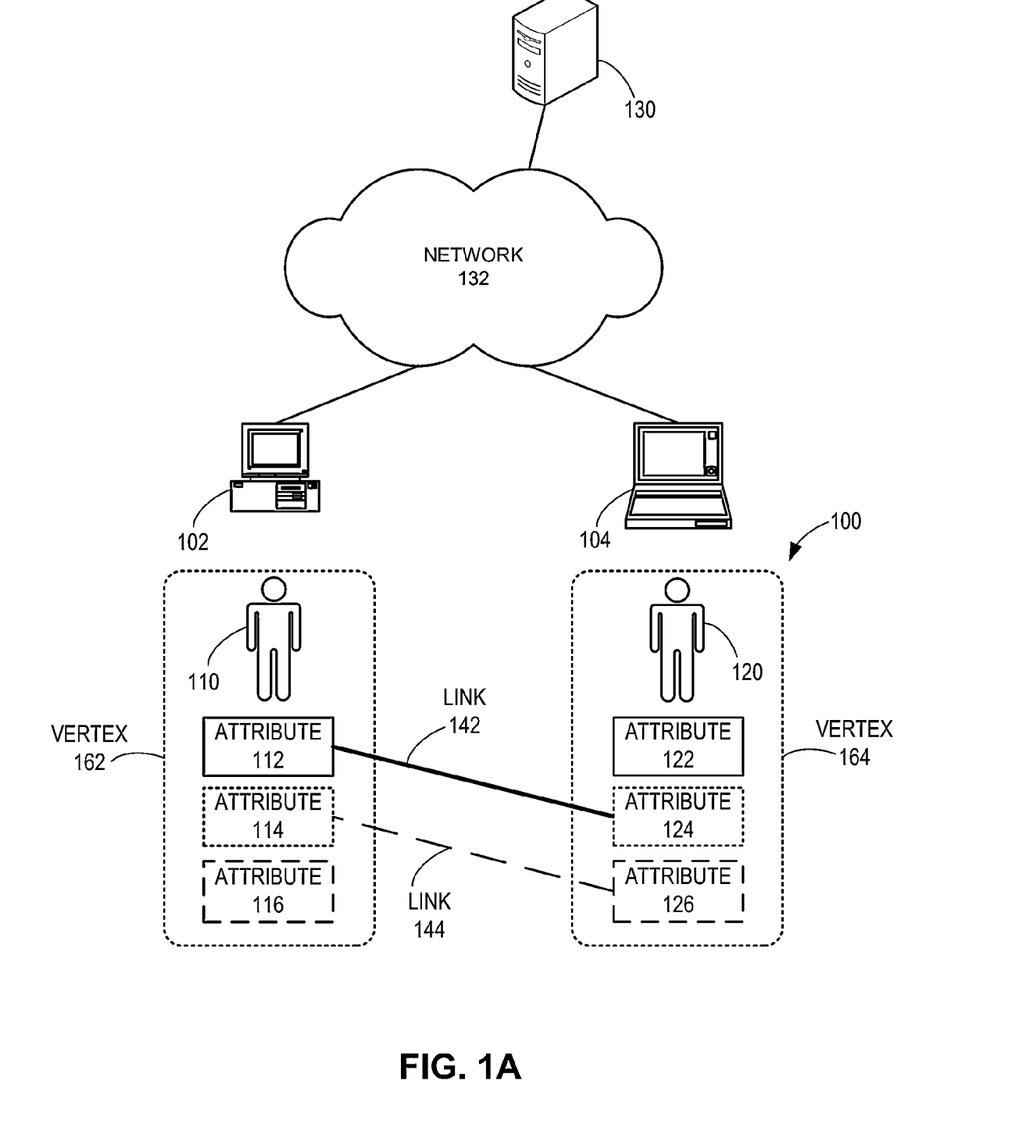
FIG. 1A illustrates an exemplary system for efficient detection of information of interest based on graph clustering, in accordance with an embodiment of the present invention.

FIG. 1A illustrates an exemplary system for efficient detection of information of interest based on graph clustering, in accordance with an embodiment of the present invention. As illustrated in FIG. 1, an information-of-interest-detection system 130 is coupled to a network 132. System 130 can be a standalone or distributed application or module in one or more computing devices. Examples of network 132 include, but are not limited to, a local area network (LAN), a wide area network (WAN), or the Internet. During operation, system 130 receives input data containing information. In some embodiments, a system administrator provides the input data to system 130. Examples of information in the input data include, but are not limited to, shopping transactions, social media messages, records of medical referrals, and email messages. System 130 can generate a collection of inferences, which can be referred to as information of interest, from the input data. Examples of information of interest include, but are not limited to, shopping preferences, social media activities, referrals (e.g., medical referrals), and e-mail traffic patterns.

In this example, the input data includes information regarding persons 110 and 120. Information regarding person 110 includes attributes 112, 114, and 116, and information regarding person 120 includes attributes 122, 124, and 126. In some embodiments, system 130 collects attributes 112, 114, and 116 while person 110 uses computing device 102, and attributes 122, 124, and 126 while person 120 uses computing device 104, via network 132. Based on the collected attributes, system 130 generates data set 100. Note that these attributes may not be associated with computing devices 102 and 104, or persons 110 and 120 (i.e., the attributes in a data set can be arbitrary without corresponding to a person or a device). On the other hand, information about persons 110 and/or 120 may enter system 130 without persons 110 and/or 120 interacting with a computing device. For example, system 130 can include attributes about persons 110 and/or 120 when persons 110 and/or 120 buy from a physical store, are referred by a doctor, or are referred to in a third party social media post or email message. System 130 then creates vertex 162 representing the attributes of person 110 and vertex 164 representing the attributes of person 120. Based on the type and strength of relationship between vertices 162 and 164, system 130 can create links 142 and 144 between vertices 162 and 164.

In this way, system 130 can use arbitrary data set 100 with arbitrary attributes, and associates these attributes with corresponding vertices and links. In some embodiments, data set 100 is a structured data set, wherein data set 100 comprises vertices 162 and 164, and links 142 and 144 between vertices 162 and 164. System 130 can directly receive the structured data set as well, which is already pre-processed based on the attributes, and because the vertices and links are already constructed, not requiring association of the attributes with corresponding vertices and links. For example, a different physical or virtual system can process the attributes to generate structured data set 100 and provide this structured data set 100 to system 130. System 130 can receive the input data (and/or data set 100) via memory transfer (e.g., via an optical drive or a flash drive), or via network 132.

Unlike having attributes associated with the vertices, system 130 uses the links to cluster vertices. A respective relationship between the attributes is mapped to a link between vertices. For example, links can represent different types of relationships between vertices, such as "is friend of," "is parent of," "source vertex purchased destination vertex" and "source sent email to destination in February." In this way, two vertices can be clustered together based on one or more desired relationships between them. Furthermore, a link between two vertices can be associated with a weight, which represents the strength of relationship between the vertices. In the example of FIG. 1A, link 142 represents the relationship between vertices 162 and 164 based on attributes 112 and 124, respectively. Similarly, link 144 represents the relationship between vertices 162 and 164 based on attributes 114 and 126, respectively. If the relationship represented by link 142 is stronger than the relationship represented by link 144, the weight of link 142 can be more than the weight of link 144. Note that the weight of link 142 can be less than the weight of link 144 if a lower weight indicates a stronger relationship.

Based on the type and weight of links 142 and 144, system 130 can cluster vertices 162 and 164 in a group. This grouping can provide an interpretable abstraction of data set 100 and represent desired information of interest. Suppose that data set 100 includes shopping history at a retail store. Vertex 162 then represents shopping transactions (e.g., purchases or returns) of person 110, while vertex 164 represents shopping transactions of person 120. Links 142 and 144 can represent the relationship between the shopping transactions of person 110 and person 120. For example, links 142 and 144 can represent similarity of transactions (e.g., purchases of similar color, clothing type, brand, etc.) and frequency of purchases (e.g., how frequent, when in the year, sale events attendance). By clustering vertices 162 and 164, system 130 can provide information of interest, such as how many people have bought a particular type of clothing during a particular time of year, or how effective the sale prices were at a sale event.

However, system 130 may not be able to create and store all the links while representing the relationships associated with data set 100 before deciding which links to keep, because there may not be enough memory to store the links. Even when system 130 avoids retaining information regarding all links in memory by using multiple passes to examine and instantiate links, the resulting computation becomes slow. Furthermore, simply decimating the links associated with data set 100 in a fixed pattern or omitting links at random is likely to leave vertices isolated. As a result, these isolated vertices cannot be clustered. For example, if system 130 randomly discards links 142 and 144, vertices 162 and 164 become isolated and cannot be clustered.

To solve this problem, vertices 162 and 164 can be connected to form a link (e.g., link 142 or 144) based on a condition. One of these links can be redundant, or less important (e.g., introduces little new information). For example, only one of links 142 and 144 can sufficiently represent the relationship between vertices 162 and 164. One of links 142 or 144 then can be discarded to reduce the number of links stored in memory. In this way, links that are attached to lightly connected vertices can be preserved by adjusting the links between heavily connected vertices. In some embodiments, system 130 associates a respective link count with vertices 162 and 164. This link count represents the sum of the weight of links for a vertex. If the weight of a respective link is one, the link count of the vertex represents the number of links of the vertex. When a new link is established with vertex 162, the corresponding link count is incremented by the weight of that link. For example, when link 142 is added between vertices 162 and 164, link counts for vertices 162 and 164 are incremented by the weight of link 142. If the weight of link 142 is one, the link counts for vertices 162 and 164 are incremented by one.

To establish a link between vertices 162 and 164, system 130 calculates a link indicator based on the link counts of vertices 162 and 164. In some embodiments, this link indicator is a product of the link counts. System 130 refrains from connecting vertices 162 and 164 with a link based on whether the link indicator conforms to a link threshold. For example, system 130 can refrain from connecting vertices 162 and 164 with a link if the product of the corresponding link counts is greater than the link threshold. In this way, system 130 reduces the size of the graph representing the data set and, hence, can perform graph clustering to obtain information of interest from the graph in a memory- and computation-efficient way.

Figure 1B:
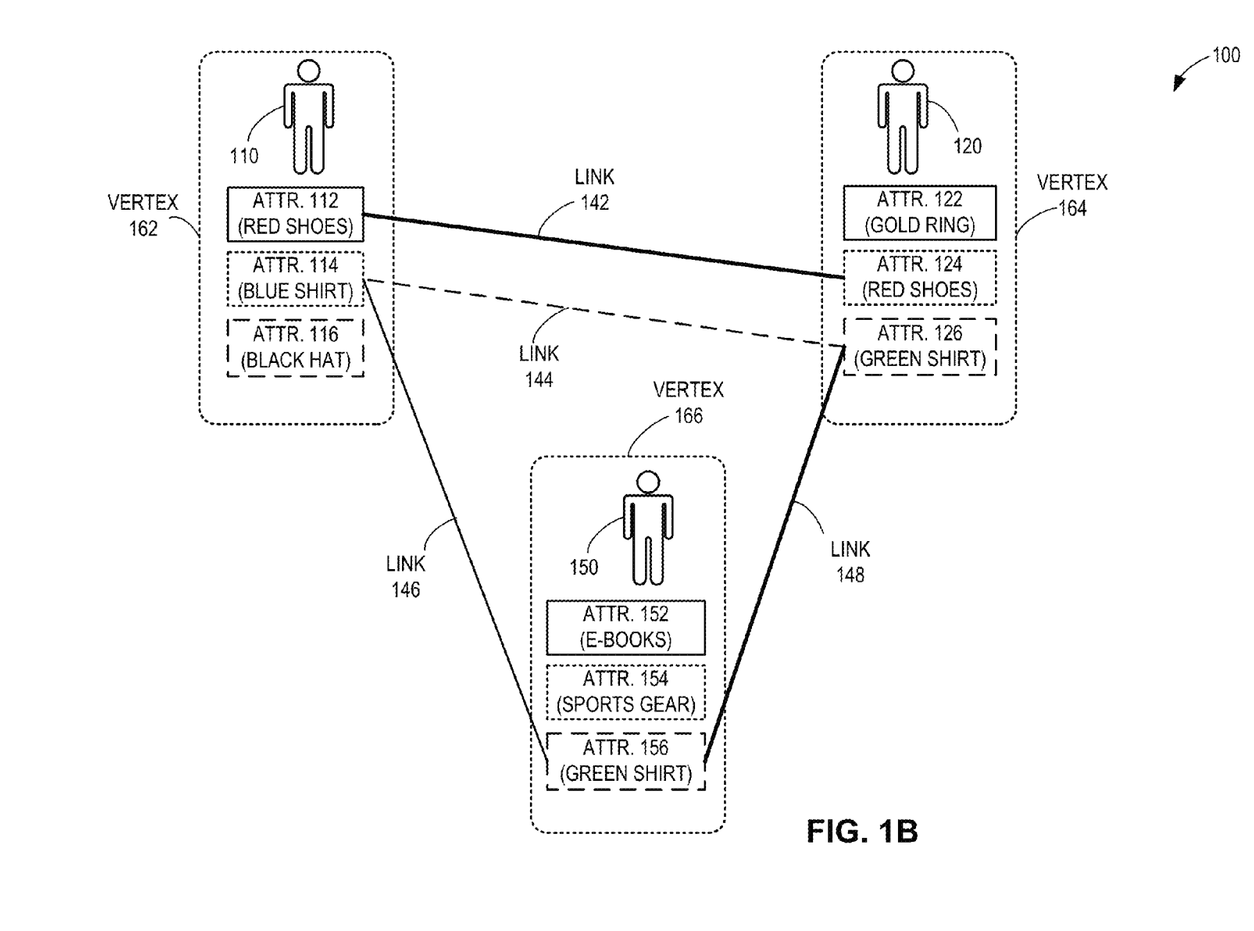
FIG. 1B illustrates an exemplary graph reduction for graph clustering, in accordance with an embodiment of the present invention.

FIG. 1B illustrates an exemplary graph reduction for graph clustering, in accordance with an embodiment of the present invention. In this example, data set 100 further includes information regarding person 150. Information regarding person 150 includes attributes 152, 154, and 156, and is represented by vertex 166. Suppose that the attributes represent the shopping history of persons 110, 120, and 150. For example, attributes 112, 114, and 116 indicate that person 110 has purchased a pair of red shoes, a blue shirt, and a black hat, respectively. Similarly, attributes 122, 124, and 126 indicate that person 120 has purchased a gold ring, a pair of red shoes, and a green shirt, respectively; and attributes 152, 154, and 156 indicate that person 150 has purchased e-books, sports gear, and a green shirt, respectively. System 130 analyzes these attributes and represents the shopping history of persons 110, 120, and 150 by vertices 162, 164, and 166, respectively.

If the information of interest is the customers with similar shopping transactions, system 130 can connect vertices 162, 164, and 166 such that the link represents the similarities among the shopping transactions of persons 110, 120, and 150. For example, because persons 110 and 120 both have purchased shoes, system 130 can connect vertices 162 and 164 and create corresponding link 142. Similarly, because persons 120 and 150 both have purchased shirts, system 130 can connect vertices 164 and 166, and create corresponding link 148. In some embodiments, system 130 assigns a weight to a link based on the strength of the relationship.

To establish a link between any two vertices among vertices 162, 164, and 166, system 130 calculates a link indicator based on the link counts of vertices 162, 164, and 166. In some embodiments, this link indicator is a product of the link counts. System 130 refrains from connecting two vertices based on whether the link indicator conforms to a link threshold. For example, system 130 can refrain from connecting two vertices with a link if the product of the corresponding link count is greater than the link threshold.

Suppose that the threshold value is three, the weight of a respective link is one, and only links 142 and 148 have been established among vertices 162, 164, and 166. Because of links 142 and 148, the link count of vertex 164 is two, and link counts of vertices 162 and 166 are one and one, respectively. Since persons 110 and 150 both have purchased shirts, system 130 identifies corresponding vertices 162 and 166 as candidates for a link. The product of link counts of vertices 162 and 166 is one, which is less than the threshold. As a result, system 130 connects vertices 162 and 166, and establishes link 146. System 130 then increments link counts of vertices 162 and 166 to two and two, respectively.

On the other hand, since persons 110 and 120 also have purchased shirts, system 130 identifies corresponding vertices 162 and 164 as candidates for a link. The product of link counts of vertices 162 and 164, which have been incremented for link 146, is four, which is greater than the threshold. As a result, system 130 refrains from establishing link 144 between vertices 162 and 164 (denoted with a dashed line). In this way, system 130 reduces the size of the graph representing data set 100 and, hence, can perform graph clustering to obtain information of interest from the graph in a memory- and computation-efficient way.

Link Indicator and Link Threshold

Figure 2A:
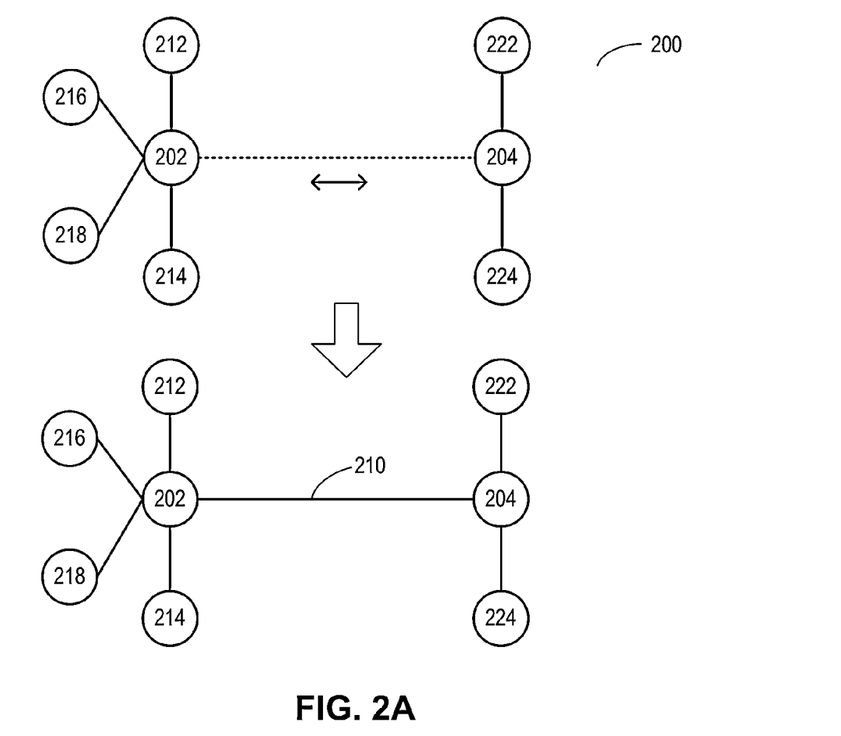
FIG. 2A illustrates an exemplary link among vertices for establishing connectivity, in accordance with an embodiment of the present invention.

In the example in FIG. 1B, system 130 establishes a link between two vertices based on whether a corresponding link indicator conforms to a link threshold. The link indicator represents a measurement (e.g., a value) indicating whether a link between two vertices should be established. The link threshold represents a measurement against which conformity of a link indicator is checked to determine whether the two vertices should be connected with a link. FIG. 2A illustrates an exemplary link among vertices for establishing connectivity, in accordance with an embodiment of the present invention.

During operation, an information-of-interest-detection system forms (or receives) vertices 202, 204, 212, 214, 216, 218, 222, and 224 from a data set to form a graph 200. A link count is associated with a respective vertex in graph 200. In some embodiments, the link count is initialized to zero and is incremented by the weight of a new link, which can be one in graph 200, each time that new link is established with the vertex (e.g., a link is added to the vertex). Based on the relationship in the data set, the system can identify two vertices as candidates for a link, as described in conjunction with FIG. 1B. If a link indicator for the two vertices conforms to a link threshold, the system establishes connectivity with a link. In some embodiments, the link indicator is the product of the corresponding link counts and the link threshold is a strictly positive number. A link cannot be added between two vertices if the product of their respective link counts exceeds the link threshold. In this way, a vertex's first potential link can always be instantiated because the product of its initial count of zero and any other count value is going to be less than any strictly positive threshold.

If having a few highly connected vertices is favored, in some embodiments, the system establishes a link (i.e., initiates or creates a link) between two vertices if the link count for either of the candidate vertices is zero. For example, suppose that vertices 212, 214, and 216 are connected to vertex 202. Hence, the link count of vertex 202 is three. During operation, the system identifies vertices 202 and 218 to be candidates for a link. The system then determines the link count for vertex 218 to be zero. The system can connect vertex 218 to vertex 202 irrespective of the link threshold. This allows for the forming of a few highly connected vertices.

When the system connects vertices 212, 214, 216, and 218 with vertex 202, the link count of vertex 202 is incremented to four, indicating that vertex 202 has four links. Similarly, when the system connects vertices 222 and 224 with vertex 204, the link count of vertex 204 is incremented to two, indicating that vertex 204 has two links. If the system identifies vertices 202 and 204 to be candidates for a link (denoted with a dotted line), the system checks whether a link indicator for vertices 202 and 204 conforms to a link threshold. A link indicator can be a function of two link counts. This function returns a value numerically comparable to the link threshold. Examples of a link indicator include, but are not limited to, the sum, product, and ratio of respective link counts of vertices 202 and 204. For example, the system can check whether the ratio of the larger of the two link counts to the smaller of the two link counts exceeds the link threshold to determine whether two vertices should be connected.

In the example in FIG. 2A, suppose that the link indicator is the sum of link counts and the link threshold value is seven. The link counts of vertices 202 and 204 are four and two, respectively. The system computes the link indicator for vertices 202 and 204 to be six by summing their respective link counts six. Because the link indicator is less than seven, the system connects vertices 202 and 204 via link 210, and increments their link counts to five and three, respectively.

In another example in FIG. 2A, suppose that the link indicator is the product of link counts and the link threshold is seven. The link counts of vertices 202 and 204 are four and two, respectively. The system computes the link indicator for vertices 202 and 204 to be eight by multiplying their respective link counts. Because the link indicator is greater than seven, the system refrains from connecting vertices 202 and 204, and retains their respective link counts.

In another example in FIG. 2A, suppose that the link indicator is the ratio of the larger of the two link counts to the smaller of the two link counts and the link threshold is seven. The link counts of vertices 202 and 204 are four and two, respectively. The system computes the link indicator for vertices 202 and 204 to be two by calculating the ratio of four to two. Because the link indicator is less than seven, the system connects vertices 202 and 204 via link 210, and increments their link counts to five and three, respectively.

In some embodiments, instead of independently deciding whether to establish an individual link between two vertices, the system divides potential links into disjoint sets and connects the links in a set if the links conform to a link-group indicator. For example, a link-group indicator can be a subset of links in the set of links conforming to the link threshold. In other words, the link-group indicator is a function of link counts of a group of vertices (i.e., the vertices associated with the links in the subset) of the graph; and this function returns one or more values numerically comparable to the link threshold. Examples of this subset includes, but are not limited to, all links in the subset, at least one of the links in the subset, the most heavily weighted links of the subset, and a combination thereof. The system can use this technique either connect or disconnect a portion of the graph, thereby giving the system (or a user of the system) some measure of control over the graph's final topology. In some embodiments, if the graph is a hypergraph (a graph in which a link can connect any number of vertices), this technique can be used to determine whether to establish a link.

Figure 2B:
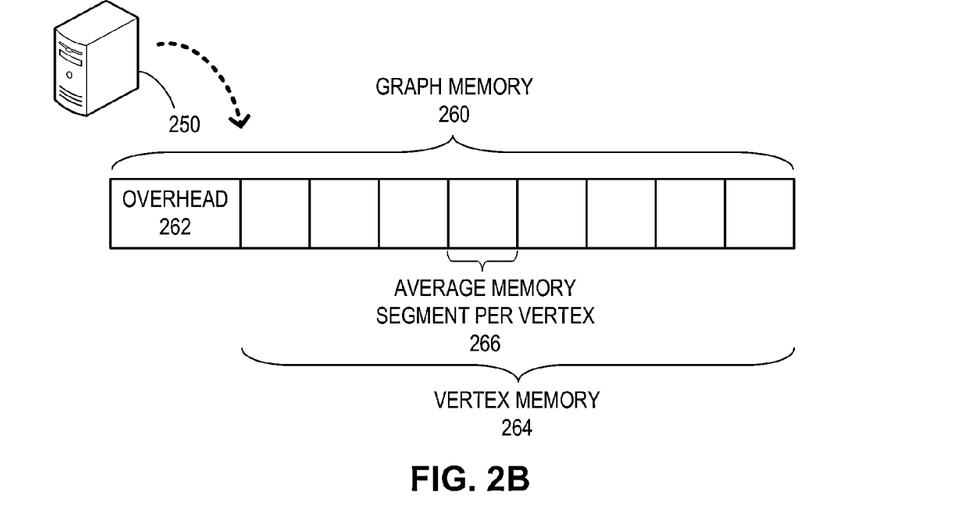
FIG. 2B illustrates an exemplary link threshold computation for vertex connectivity, in accordance with an embodiment of the present invention.

Whether two vertices are going to have a link between them depends on the link indicator for the vertices and a link threshold. FIG. 2B illustrates an exemplary link threshold computation, in accordance with an embodiment of the present invention. In the example in FIG. 2B, an information-of-interest-detection system 250, which can be a computing device comprising a processor and memory, forms the vertices of graph 200 from a data set. System 250 performs the computations associated with graph forming and subsequent graph clustering. In some embodiments, an input from a user (e.g., a system administrator) can specify how much memory of system 250 is dedicated for the computing system. Examples of a user input include, but are not limited to, a command-line interface command, a graphical user interface (GUI) input, a text file, and a script.

Based on the specification from the user, system 250 can allocate a graph memory 260 from the memory of system 250. Graph memory 260 can be used for performing the computations associated with extracting information of interest. In some embodiments, system 250 identifies the memory overhead 262 from graph memory 260. Overhead 262 is the unavoidable overhead for performing the computations. The rest of the memory can be referred to as vertex memory 264 and is typically used for clustering of vertices. System 250 subtracts the size of overhead 262 from the size of graph memory 260 to determine the size of vertex memory 264. System 250 divides the size of vertex memory 264 by the number of vertices (e.g., eight in the example in FIG. 2A) to estimate an average memory segment per vertex 266.

The system determines the link threshold based on the size of average memory segment per vertex 266. In some embodiments, the system squares the size of average memory segment per vertex 266 (i.e., the result of the division) to obtain the link threshold. This way of determining a threshold value allows pairs of vertices to connect until the vertices have the average number of allowable links. This threshold value allows a large number of vertices to each have one link to a heavily connected vertex, but favors links between lightly connected vertices.

Managing Resources and Performance

In the examples in FIGS. 2A and 2B, an information-of-interest-detection system associates a link count with a respective vertex, determines a link threshold, calculates a link indicator for a vertex-pair based on their respective link counts, and checks whether a link should be established between the vertices based on conformity of the link indicator with the link threshold. Based on these operations, the system reduces the size of the graph representing a data set and, hence, can perform graph clustering to obtain information of interest from the graph in a memory- and computation-efficient way.

Figure 3A:
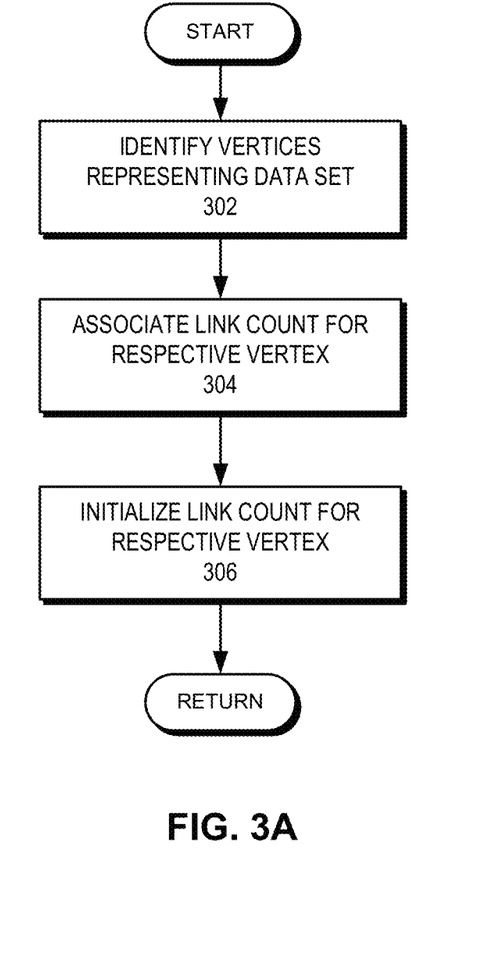
FIG. 3A presents a flowchart illustrating the link count initialization process of an information-of-interest-detection system for vertex connectivity, in accordance with an embodiment of the present invention.

FIG. 3A presents a flowchart illustrating the link count initialization process of an information-of-interest-detection system for link vertex connectivity, in accordance with an embodiment of the present invention. During operation, the system identifies the vertices representing a data set (operation 302). In the example in FIG. 1A, the system identifies the customers in a data set of retail activities and represents the customers as vertices. The system associates a link count for a respective vertex (operation 304). In some embodiments, the link count is a counter (e.g., an integer). The system then initializes the link count for a respective vertex (operation 306). In some embodiments, the system initializes the link count with zero. If the link indicator is a product of two link counts, an initial value of zero allows a vertex with no link to connect with another vertex, regardless of the link count of the other vertex.

Figure 3B:
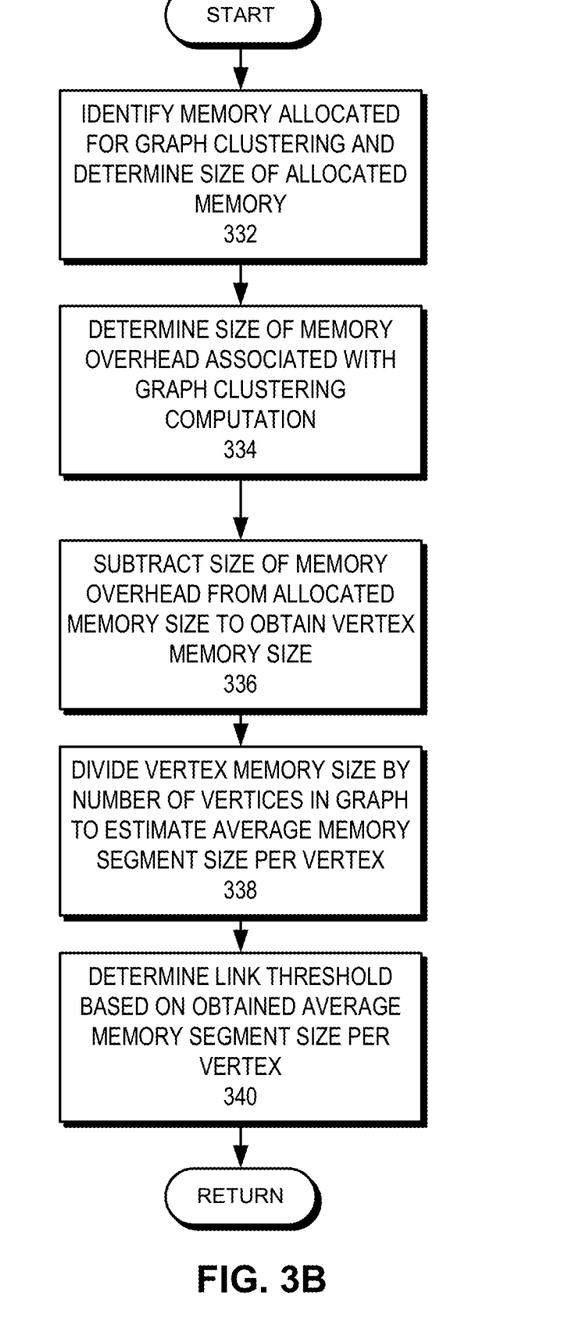
FIG. 3B presents a flowchart illustrating the link threshold computation process of an information-of-interest-detection system for vertex connectivity, in accordance with an embodiment of the present invention.

FIG. 3B presents a flowchart illustrating the link threshold computation process of an information-of-interest-detection system for vertex connectivity, in accordance with an embodiment of the present invention. During operation, the system identifies the memory allocated for graph clustering and determines the size of the allocated memory (operation 332). In some embodiments, a user allocates the memory of a specific size determined by the user. The system then determines the size of memory overhead associated with the graph clustering computation (operation 334). This memory overhead can correspond to the non-vertex specific operations of graph clustering.

The system subtracts the size of memory overhead from the allocated memory size to obtain the vertex memory size (operation 336), as described in conjunction with FIG. 2B. The vertex memory can be used for vertex-specific operations of graph clustering. The system divides the vertex memory size by the number of vertices in the graph to estimate the average memory segment size per vertex (operation 338). The system then determines the link threshold based on the obtained average memory segment size per vertex (operation 340), as described in conjunction with FIG. 2B. In some embodiments, the system squares the average memory segment size per vertex (i.e., the result of the division in operation 338) to obtain the link threshold.

Figure 4:
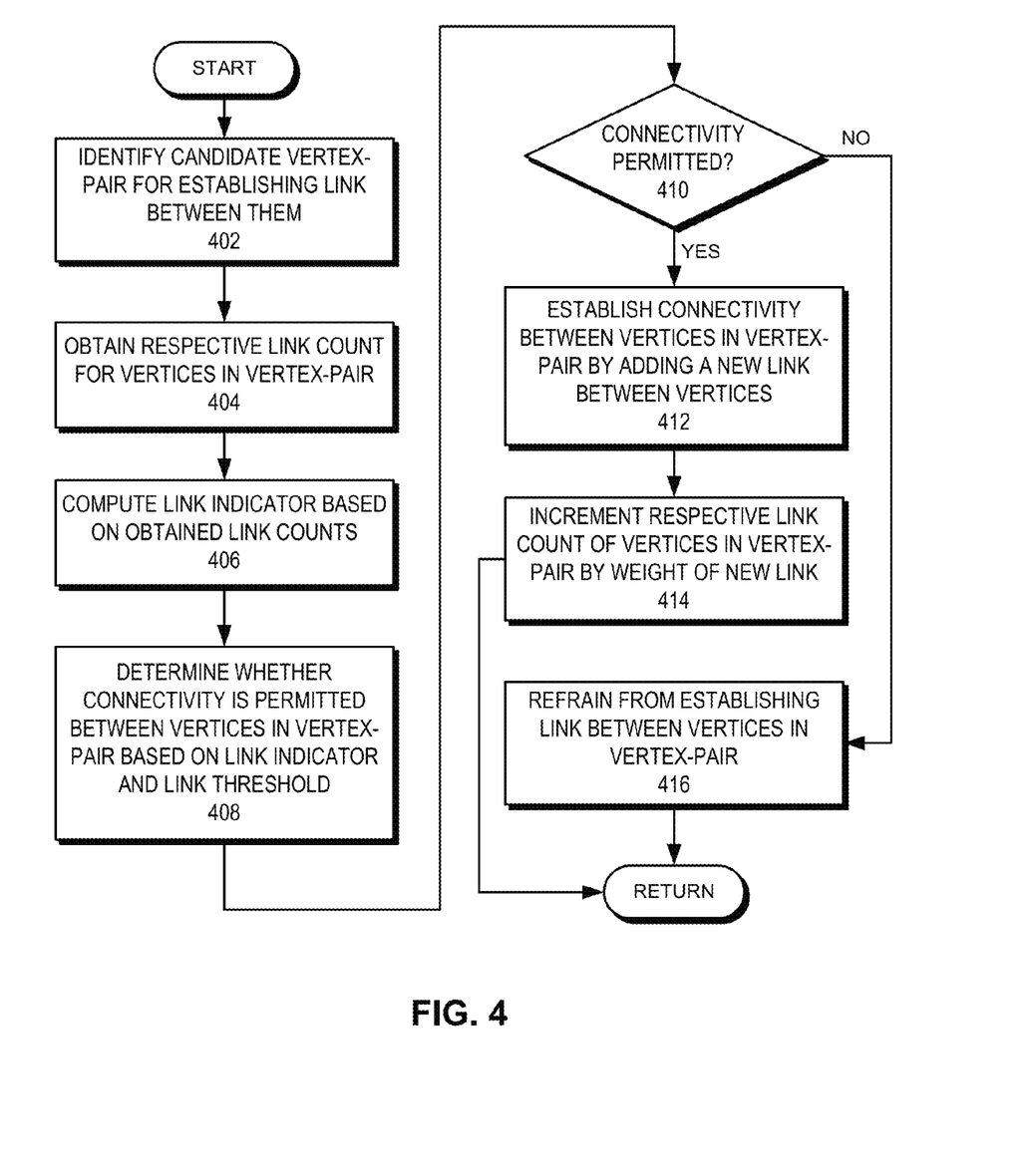
FIG. 4 presents a flowchart illustrating the link forming process of an information-of-interest-detection system for graph clustering, in accordance with an embodiment of the present invention.

FIG. 4 presents a flowchart illustrating the link forming process of an information-of-interest-detection system for graph clustering, in accordance with an embodiment of the present invention. During operation, the system identifies a candidate vertex-pair for establishing a link between them (i.e., the pair) (operation 402). The system obtains respective link count for vertices in the vertex-pair (operation 404) and computes the link indicator based on the obtained link counts (operation 406), as described in conjunction with FIG. 2A. A link indicator can be a function of two link counts. This function returns a value numerically comparable to the link threshold. Examples of a link indicator include, but are not limited to, the sum, product, and ratio of the obtained link counts.

The system then determines whether connectivity is permitted between the vertices in the vertex-pair based on the link indicator and a link threshold (operation 408). In some embodiments, the link threshold is determined based on the user-allocated memory size. The system checks whether the connectivity is permitted (operation 410). If connectivity is permitted, the system establishes connectivity between the vertices in the vertex-pair by adding a new link between vertices (operation 412) and increments the respective link counts of vertices in the vertex-pair by the weight of the new link (operation 414). If the weight of the new link is one, the link count is incremented by one. If a connectivity is not permitted, the system refrains from establishing a link between the vertices in the vertex-pair (operation 416).

Graph Clustering Technique Selection

If a large amount of memory is available and the user sets the memory limit quite high, the link threshold becomes high, as described in conjunction with FIG. 2B. As a result, more links are established between vertices (i.e., few links are discarded), leading to a high accuracy of graph clustering. However, such high accuracy graph clustering can take a relatively long time to perform the graph traversals involved in the graph clustering. Embodiments of the present invention solve this problem by artificially reducing the memory limit so that fewer links are established (i.e., more links are discarded). The system can allow a user to set the memory limit. As a result, graph clustering performance improves (e.g., a fast convergence) even though graph clustering accuracy can deteriorate. This allows users to apply a plurality of graph clustering techniques relatively quickly with a low memory limit, and then increase the memory limit for improved accuracy once the user chooses a particular type of graph clustering technique.

Figure 5:
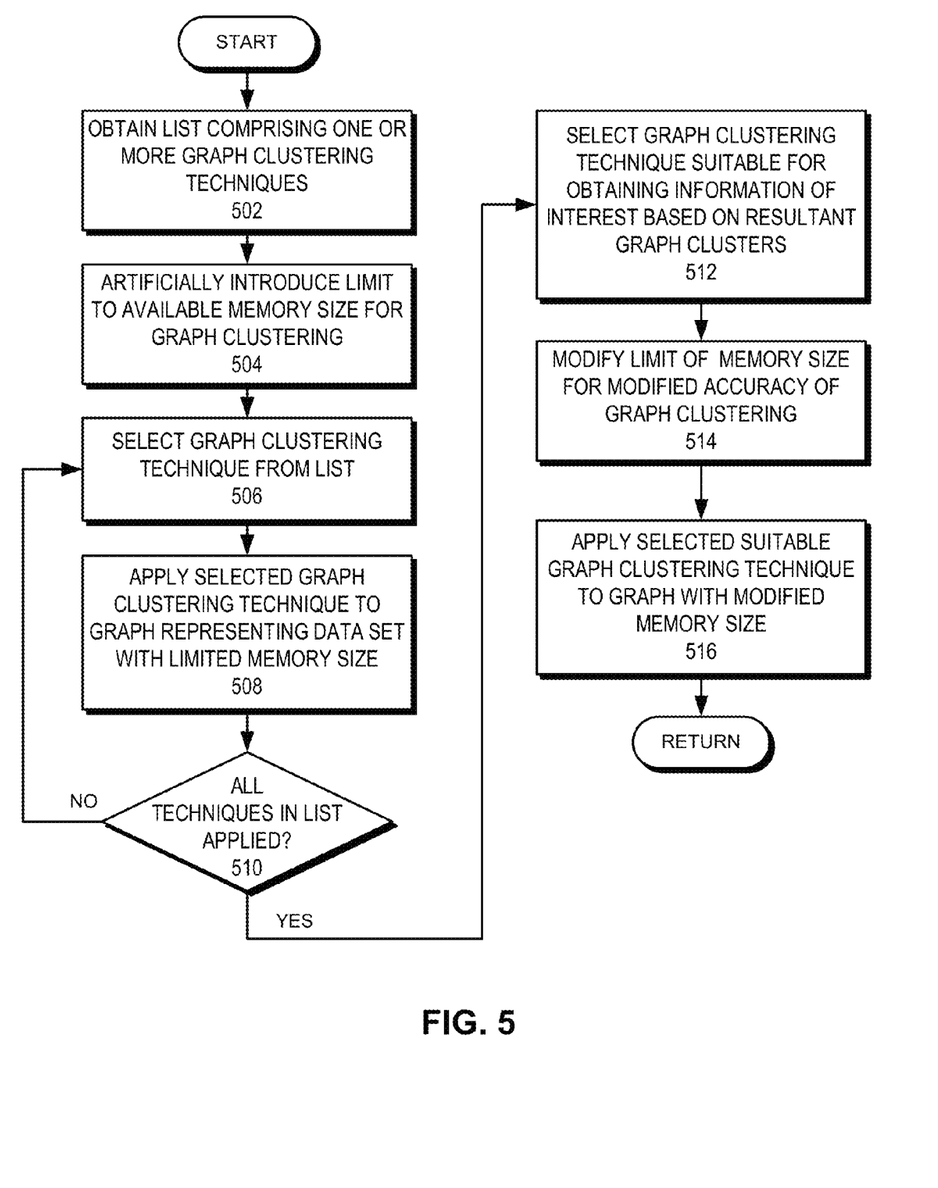
FIG. 5 presents a flowchart illustrating the graph clustering technique selection process of an information-of-interest-detection system for a graph representing a data set, in accordance with an embodiment of the present invention.

FIG. 5 presents a flowchart illustrating the graph clustering technique selection process of an information-of-interest-detection system for a graph representing a data set, in accordance with an embodiment of the present invention. During operation, the system obtains a list comprising one or more graph clustering techniques (operation 502). In some embodiments, a user provides the list to the system. The system artificially introduces a limit to the available memory size for graph clustering (operation 504). This memory limit can have a high threshold or a low threshold. Artificially limiting the memory size to a low threshold improves graph clustering speed at the expense of reduced accuracy. On the other hand, artificially limiting the memory size to a high threshold increases accuracy at the expense of lowered performance. For example, if the high threshold represents all of available memory, artificially limiting the memory size to the high threshold may cause slower memory access. The system can obtain the memory limit and the high or low threshold from a user. The system then selects a graph clustering technique from the list (operation 506) and applies the selected graph clustering technique to the graph representing the data set with the limited memory size (operation 508).

The system checks whether all techniques in the list have been applied (operation 510). If not, the system selects another graph clustering technique from the list (operation 506) and applies the selected graph clustering technique to the graph with the limited memory size (operation 508). If all techniques in the list have been applied, the system selects a graph clustering technique suitable for obtaining the information of interest based on the resultant graph clusters (operation 512). In some embodiments, a user determines the suitable technique. The system then modifies the limit of memory size for modified accuracy of the graph clustering (operation 514) and applies the selected suitable graph clustering technique to the graph with an increased memory limit (operation 516). This modified memory size can represent an increased memory size than the low threshold or a decreased memory size than the high threshold. It should be noted that artificially limiting the memory size to a high or a low threshold can be used for other graph clustering approaches. Examples of such approaches include, but are not limited to, quickly testing the system by limiting the memory size to a low threshold; and quickly partitioning the graph into clusters by limiting the memory size to a low threshold and more accurately generating clusters for a portion of the original graph by increasing the memory size than the low threshold.

Exemplary System

Figure 6:
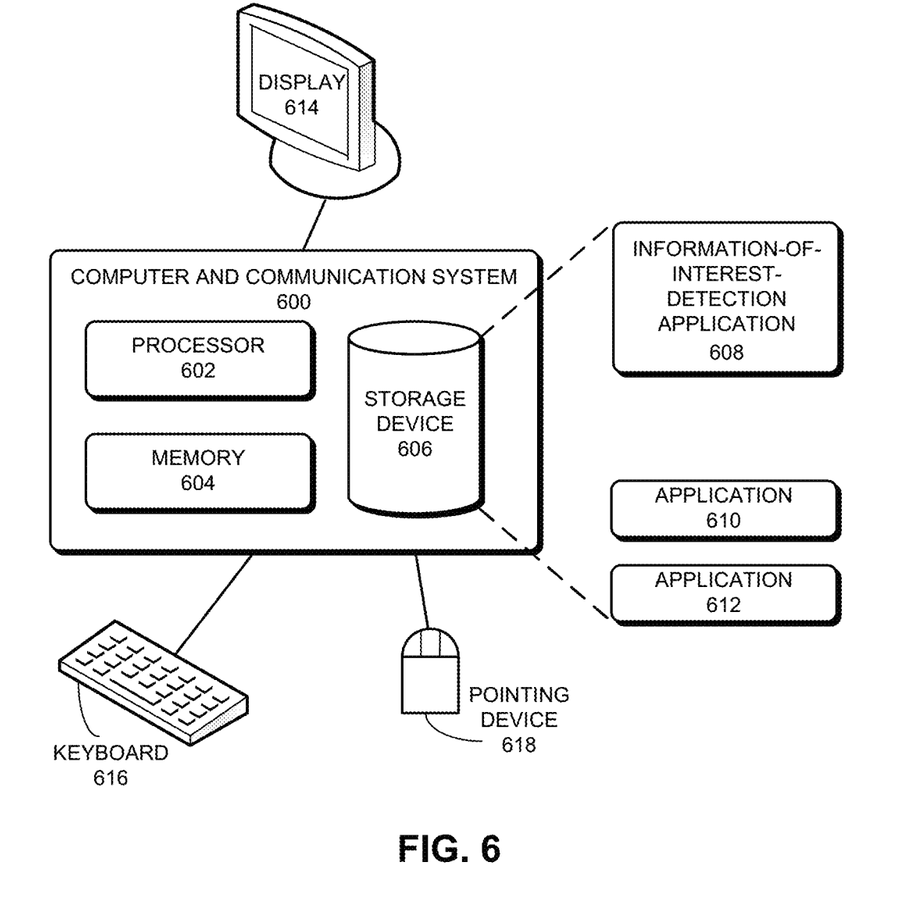
FIG. 6 illustrates an exemplary information-of-interest-detection system, in accordance with an embodiment of the present invention.

FIG. 6 illustrates an exemplary information-of-interest-detection system, in accordance with an embodiment of the present invention. In one embodiment, a computer and communication system 600 operates as an information-of-interest-detection system. Computer and communication system 600 includes a processor 602, a memory 604, and a storage device 606. Storage device 606 stores an information-of-interest-detection application 608, as well as other applications, such as applications 610 and 612. During operation, information-of-interest-detection application 608 is loaded from storage device 606 into memory 604 and then executed by processor 602. While executing the program, processor 602 performs the aforementioned functions. Computer and communication system 600 is coupled to an optional display 614, keyboard 616, and pointing device 618. In some embodiments, information-of-interest-detection application 608 can be executed on a plurality of computer and communication systems, which are able to exchange data that describes the state of the operation associated with information-of-interest-detection application 608.

Note that the above-mentioned modules can be implemented in hardware as well as in software. In one embodiment, these modules can be embodied in computer-executable instructions stored in a memory which is coupled to one or more processors in computer and communication system 600. When executed, these instructions cause the processor(s) to perform the aforementioned functions.

In summary, embodiments of the present invention provide a computer system and a method for detecting information of interest. In one embodiment, the computing system includes a processor and a memory. The memory stores instructions which when executed by the processor cause the processor to perform a method. The method comprises identifying a first vertex and a second vertex in a graph as candidates for a link between the first and the second vertices. The first vertex and the second vertex represent elements in a data set. The method further comprises determining a link indicator based on a first link count, which indicates a sum of respective weights of links of a vertex, associated with the first vertex and a second link count associated with the second vertex. The method also includes determining whether to connect the first and the second vertices with a link based on the link indicator's conformity with a link threshold, which determines whether to connect two vertices using a link.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executable method, comprising:
storing in a storage device of a computer a data set comprising a plurality of data elements;
determining, by the computer, a type and strength of relationship between a first and a second data elements in the plurality of data elements;
representing the first data element as a first vertex and the second data element as a second vertex in a graph;
identifying the first vertex and the second vertex as candidates for establishing a link between the first and the second vertices;
determining a link threshold, which represents a measurement to determine whether to connect two vertices using a link, based on an average vertex memory segment per vertex; wherein the average vertex memory segment per vertex is determined by dividing a vertex memory size by number of vertices in the graph; and wherein the vertex memory size is determined by subtracting size of a memory overhead from a size of an allocated memory;
determining a link indicator based on a first link count associated with the first vertex and a second link count associated with the second vertex, wherein a link count indicates a sum of respective weights of links of a vertex;
determining whether to connect the first and the second vertices with a link for forming a graph cluster based on the link indicator's conformity with the link threshold; and
in response to determining the link indicator's conformity with the link threshold, connecting the first and the second vertices with a link for forming a graph cluster.

2. The method of claim 1, wherein the link indicator is one or more of:
a function of the first and the second link counts, wherein the function returns a value numerically comparable to the link threshold; and
a function of link counts of a group of vertices of the graph, wherein the function returns one or more values numerically comparable to the link threshold.

3. The method of claim 1, further comprising connecting the first and the second vertices with a link in response to at least one of the first and the second link counts being zero.

4. The method of claim 1, further comprising increasing the first and the second link counts in response to connecting the first and the second vertices with a link.

5. The method of claim 1, further comprising, in response to determining the link indicator's non-conformity with the link threshold, refrain from connecting the first and the second vertices with a link.

6. The method of claim 1, wherein determining the link threshold further comprises:
squaring the average memory segment per vertex.

7. The method of claim 1, further comprising limiting memory size allocated for the graph clustering based on a high or a low threshold.

8. The method of claim 7, further comprising applying a suitable graph clustering technique to the graph with a modified memory size, wherein the modified memory size represents an increased memory size than the low threshold or a decreased memory size than the high threshold.

9. A non-transitory computer-readable storage medium storing instructions that when executed by a computer cause the computer to perform a method, the method comprising:
storing in a storage device of a computer a data set comprising a plurality of data elements;
determining, by the computer, a type and strength of relationship between a first and a second data elements in the plurality of data elements;
representing the first data element as a first vertex and the second data element as a second vertex in a graph;
identifying the first vertex and the second vertex as candidates for establishing a link between the first and the second vertices;
determining a link threshold, which represents a measurement to determine whether to connect two vertices using a link, based on an average vertex memory segment per vertex; wherein the average vertex memory segment per vertex is determined by dividing a vertex memory size by number of vertices in the graph; and wherein the vertex memory size is determined by subtracting size of a memory overhead from a size of an allocated memory;
determining a link indicator based on a first link count associated with the first vertex and a second link count associated with the second vertex, wherein a link count indicates a sum of respective weights of links of a vertex;
determining whether to connect the first and the second vertices with a link for forming a graph cluster based on the link indicator's conformity with the link threshold; and
in response to determining the link indicator's conformity with the link threshold, connecting the first and the second vertices with a link for forming a graph cluster.

10. The non-transitory computer-readable storage medium of claim 9, wherein the link indicator is one or more of:
a function of the first and the second link counts, wherein the function returns a value numerically comparable to the link threshold; and
a function of link counts of a group of vertices of the graph, wherein the function returns one or more values numerically comparable to the link threshold.

11. The non-transitory computer-readable storage medium of claim 9, wherein the method further comprises connecting the first and the second vertices with a link in response to at least one of the first and the second link counts being zero.

12. The non-transitory computer-readable storage medium of claim 9, wherein the method further comprises increasing the first and the second link counts in response to connecting the first and the second vertices with a link.

13. The non-transitory computer-readable storage medium of claim 9, wherein the method further comprises, in response to determining the link indicator's non-conformity with the link threshold, refrain from connecting the first and the second vertices with a link.

14. The non-transitory computer-readable storage medium of claim 9, wherein determining the link threshold further comprises:
squaring the average memory segment per vertex.

15. The non-transitory computer-readable storage medium of claim 9, wherein the method further comprises limiting memory size allocated for the graph clustering based on a high or a low threshold.

16. The non-transitory computer-readable storage medium of claim 15, wherein the method further comprises applying a suitable graph clustering technique to the graph with a modified memory size, wherein the modified memory size represents an increased memory size than the low threshold or a decreased memory size than the high threshold.

17. A computing system, comprising:
a processor; and
a memory storing instructions which when executed by the processor cause the processor to perform a method, the method comprising:
   storing in a storage device of a computer a data set comprising a plurality of data elements;
   determining, by the computer, a type and strength of relationship between a first and a second data elements in the plurality of data elements;
   representing the first data element as a first vertex and the second data element as a second vertex in a graph;
   identifying the first vertex and the second vertex as candidates for a link between the first and the second vertices;
   determining a link threshold, which represents a measurement to determine whether to connect two vertices using a link, based on an average vertex memory segment per vertex; wherein the average vertex memory segment per vertex is determined by dividing a vertex memory size by number of vertices in the graph; and wherein the vertex memory size is determined by subtracting size of a memory overhead from a size of an allocated memory;
   determining a link indicator based on a first -link count associated with the first vertex and a second link count associated with the second vertex, wherein a link count indicates a sum of respective weights of links of a vertex;
   determining whether to connect the first and the second vertices with a link for forming a graph cluster based on the link indicator's conformity with the link threshold; and
   in response to determining the link indicator's conformity with the link threshold, connecting the first and the second vertices with a link for forming a graph cluster.

18. The computing system of claim 17, wherein the link indicator is one or more of:
   a function of the first and the second link counts, wherein the function returns a value numerically comparable to the link threshold; and
   a function of link counts of a group of vertices of the graph, wherein the function returns one or more values numerically comparable to the link threshold.

19. The computing system of claim 17, wherein the method further comprises connecting the first and the second vertices with a link in response to at least one of the first and the second link counts being zero.

20. The computing system of claim 17, wherein the method further comprises increasing the first and the second link counts in response to connecting the first and the second vertices with a link.

21. The computing system of claim 17, wherein the method further comprises, in response to determining the link indicator's non-conformity with the link threshold, refrain from connecting the first and the second vertices with a link.

22. The computing system of claim 17, wherein determining the link threshold further comprises:
   squaring the average memory segment per vertex.

23. The computing system of claim 17, wherein the method further comprises limiting memory size allocated for the graph clustering based on a high or a low threshold.

24. The computing system of claim 23, wherein the method further comprises applying a suitable graph clustering technique to the graph with a modified memory size, wherein the modified memory size represents an increased memory size than the low threshold or a decreased memory size than the high threshold.

\* \* \* \* \*